United States Patent [19]

Nakahashi et al.

[11] Patent Number: 4,516,840
[45] Date of Patent: May 14, 1985

[54] IN-FOCUS DETECTOR FOR A BINOCULAR STEREOMICROSCOPE

[75] Inventors: Ken-ichi Nakahashi; Shin-ichi Mihara, both of Hachioji, Japan

[73] Assignee: Olympus Optical Co., Ltd., Japan

[21] Appl. No.: 392,350

[22] Filed: Jun. 25, 1982

[30] Foreign Application Priority Data

Jul. 31, 1981 [JP] Japan .................. 56-119262

[51] Int. Cl.³ .............................. G02B 21/00
[52] U.S. Cl. ..................... 350/515; 250/201
[58] Field of Search .......... 350/515; 250/201, 201 AF

[56] References Cited

U.S. PATENT DOCUMENTS

| | | | |
|---|---|---|---|
| 3,405,990 | 10/1968 | Nothnagle et al. | 350/515 |
| 3,721,827 | 3/1973 | Reinheimer | 250/201 |
| 4,153,834 | 5/1979 | Hayamizu | 250/201 |
| 4,255,029 | 3/1981 | Freudenschuss | 250/201 X |

FOREIGN PATENT DOCUMENTS 2423136 11/1975 Fed. Rep. of Germany .
156933 12/1975 Japan .

Primary Examiner—John K. Corbin
Assistant Examiner—Lynn Vandenburgh Kent
Attorney, Agent, or Firm—Ostrolenk, Faber, Gerb & Soffen

[57] ABSTRACT

An in-focus detector for a binocular stereomicroscope having a pair of left- and right-hand observation optics includes a pair of beam splitters, each disposed intermediate the objective lens and the eyepieces of the respective observation optics. The first one of the beam splitters introduces the optical image of a mark into one of the observation optics, which then focuses it on an object being observed. The image is then reflected by the object and passes through the other observation optics to be reflected by the second beam splitter so as to be directed externally of the observation optics and focussed on a photoelectric transducer element, which is effective to detect an in-focus condition.

16 Claims, 11 Drawing Figures

FIG. 1
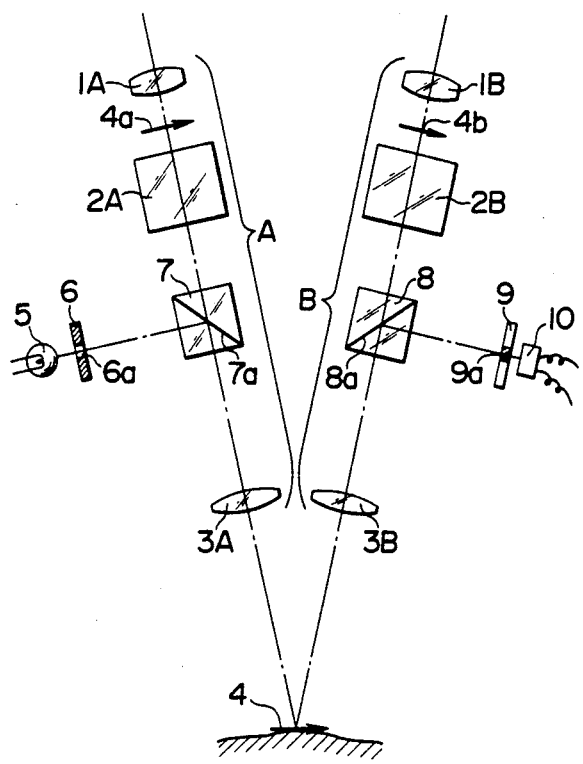
FIG. 2 FIG. 3
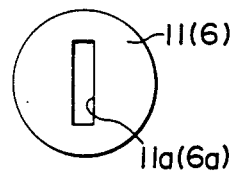 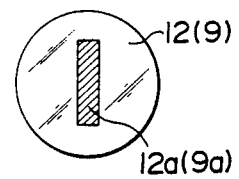
FIG. 4 FIG. 5 FIG. 6 FIG. 7
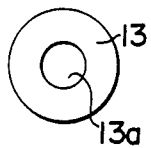 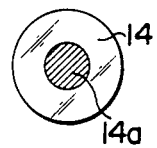 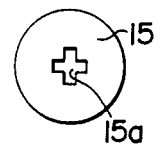 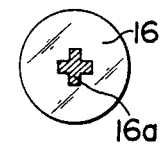

FIG. 8
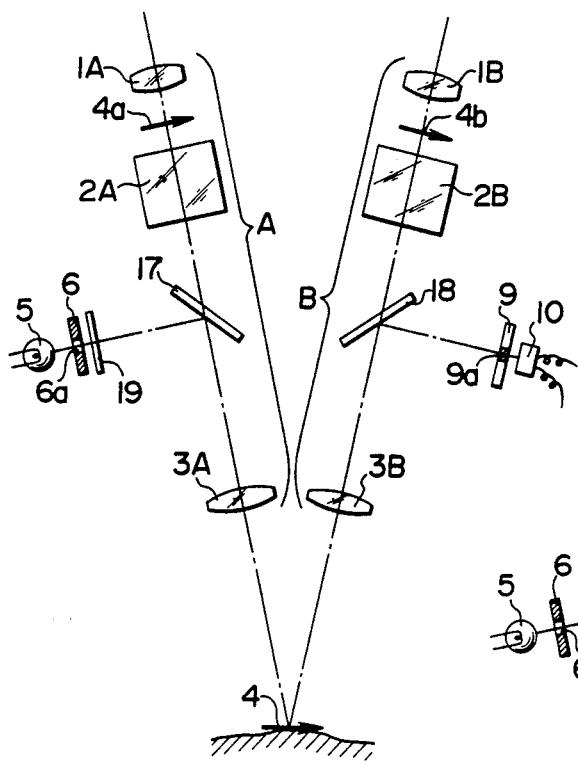
FIG. 9
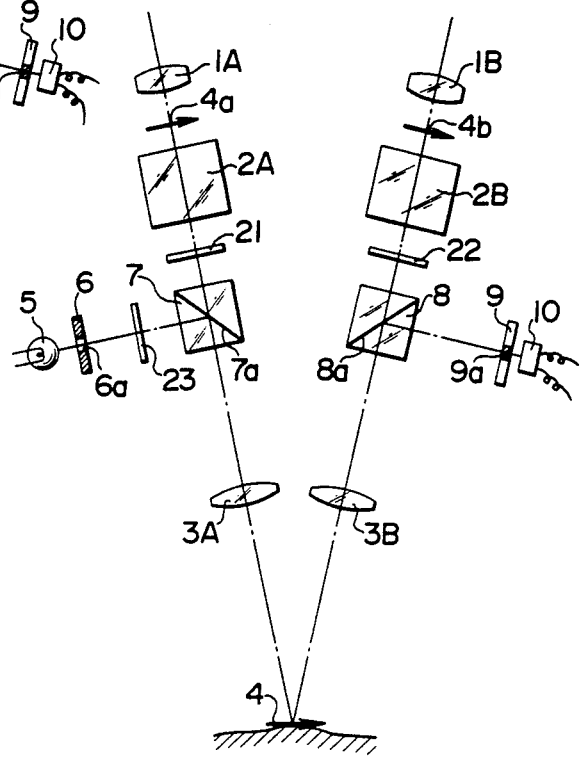
FIG. 10      FIG. 11
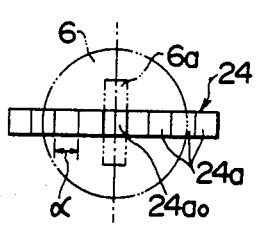 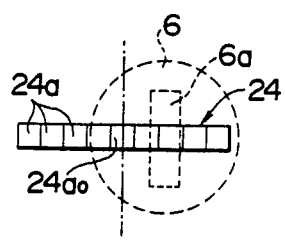

IN-FOCUS DETECTOR FOR A BINOCULAR STEREOMICROSCOPE

BACKGROUND OF THE INVENTION

The invention relates to an in-focus detector for a binocular stereomicroscope, and more particularly, to an in-focus detector for use in a binocular stereomicroscope having a pair of left- and right-hand observation optics.

Generally, a binocular stereomicroscope includes a pair of left- and right-hand observation optics to permit a stereoscopic vision, and obtains an increased depth of field. Accordingly, it finds applications in precision machine tooling or surgical operations of details physical bodies. It will be recognized that an object being observed by such microscope includes surface unevenness, which requires repeated focussing operations before a subsequent operation is entered or in the course of an operation. This is particularly true in a surgical operation wherein the object being observed is a living body, which is subject to respiration and pulsation to cause defocussing. Accordingly, the intended operation must be frequently interrupted, which is highly inconvenient. It will be seen that the eyes of a man have the capability to automatically accommodate for a degree of defocussing. This, together with the increased depth of field of a binocular stereomicroscope, degrades the focussing accuracy, which is particularly disadvantageous in taking pictures.

SUMMARY OF THE INVENTION

It is an object of the invention to provide an in-focus detector for a binocular stereomicroscope in which beam splitters are disposed in both the left- and right-hand observation optics so that the optical image of a detection mark is projected onto an object being observed through a first one of the beam splitters and the reflected image is passed through a second beam splitter to be derived externally of the observation optics so as to impinge upon a photoelectric transducer element, which is then effective to detect an in-focus condition of the object.

The invention advantageously utilizes the pair of observation optics which are inherently provided in a binocular stereomicroscope. Beam splitters disposed within the individual observation optics permit the optical image of a mark to be projected onto an object being observed and the reflected image to be derived so as to impinge upon a photoelectric transducer element which is disposed outside the observation optics. In this manner, an in-focus condition can be detected reliably with a simple arrangement. Invisible light may be employed to project the optical image of the mark in order to avoid any adverse influence upon the light being utilized for purpose of observation, thus effectively preventing the occurrence of flares in the observation optics.

BRIEF DESCRIPTION OF THE DRAWINGS

FIG. 1 is a schematic view of an in-focus detector for a binocular stereomicroscope according to one embodiment of the invention;

FIGS. 2 to 7 are schematic front views of various mark members which may be used in the detector of FIG. 1;

FIG. 8 is a schematic view of an in-focus detector according to another embodiment of the invention;

FIG. 9 is a schematic view of an in-focus detector according to a further embodiment of the invention; and FIGS. 10 and 11 are schematic front views of a photoelectric transducer element which receives the optical image of the mark, FIG. 10 illustrating an in-focus condition and FIG. 11 illustrating an out-of-focus condition.

DESCRIPTION OF PREFERRED EMBODIMENTS

Referring to FIG. 1, there is shown a schematic view of an in-focus detector for a binocular stereomicroscope according to one embodiment of the invention. The stereomicroscope comprises first observation optical system A including eyepiece 1A, erection prism 2A and objective lens 3A, and second observation optical system B including eyepiece 1B, erection prism 2B and objective lens 3B. When the pair of optical systems A, B are used to observe an object 4, erect images 4a, 4b are focussed intermediate the eyepiece 1A, 1B and erection prism 2A, 2B within the respective observation optical systems A, B. In this manner, a magnified stereoscopic vision of the object 4 is enabled.

The in-focus detector of the invention is constructed by utilizing part of the observation optical systems of the binocular stereomicroscope. Specifically, the in-focus detector comprises a light source 5 and a mark member 6 disposed outside the observation optical system A, a first beam splitter 7 disposed intermediate the erection prism 2A and the objective lens 3A of the optical system A, a second beam splitter 8 disposed intermediate the erection prism 2B and the objective lens 3B of the optical system B, and a mask member 9 and a photoelectric transducer element 10, both disposed outside the observation optics B.

Each of the first and the second beam splitter 7, 8 is formed as a semi-transmitting prism having a semi-transmitting film 7a, 8a on its joined surfaces. The mark member 6 and the mask member 9 are positioned relative to the objective lenses 3A, 3B so that they are conjugate to each other with respect to the object 4 being observed when the stereomicroscope is in focus. As illustrated in FIG. 2, the mark member 6 may comprise a light shield 11 formed by a metal disc which is centrally formed with a slit-like opening 11a which defines a mark 6a. In a corresponding manner, the mask member 9 associated with the mark member 6 may comprise a transparent glass disc 12 which exhibits a high transmission of light and which is centrally formed with an elongate slit-like light shielding area 12a which corresponds in configuration to the opening 11a formed in the light shield 11. The area 12a defines a mask 9a. The light shielding area 12a may be formed by applying a black paint or by evaporating a metal such as chromium which is overlaid with an anti-reflection film. It will thus be seen that the mark 6a and mask 9a have a relationship therebetween which is likened to the relationship between a photographic positive and negative. It is to be understood that the transducer element 10 has a light receiving surface of an area which is sufficiently greater than that of the mask 9a.

In operation, when the mark member 6 is irradiated by light from the source 5, the optical image of the mark 6a is directed to the first beam splitter 7, the semi-transmitting film 7a of which reflects the image into the optical path of the observation optical system A, whereby the image is projected onto the object 4 through the objective lens 3A. The optical image of the mark 6 is then reflected by the object and passes through the objective lens 3B of the observation optical system B to be reflected by the semi-transmitting film 8a of the second beam splitter 8 out of the observation optical system B so as to impinge upon the light receiving surface of the transducer element 10 after passing through the mask member 9.

If the binocular stereomicroscope is in focus, the optical image of the mark 6a will be focussed on the mask member 9 after it has once been focussed on and reflected by the object 4.

Since the mark 6a and the mask 9a are optically related such that one of them represents a photographic positive while the other a photographic negative, the optical image of the mark 6a will be in complete coincidence with the mask 9a, and hence the light from the source 5 is substantially completely interrupted by the mask member 9, preventing it from impinging upon the light receiving surface of the transducer element 10. However, when the binocular stereomicroscope is in out-of-focus condition, the mark member 6 and the mask member 9 will no longer be positioned relative to the associated object lenses 3A, 3B so that they are conjugate with respect to the object 4, and hence the optical image of the mark 6a will not be focussed on the mask member 9. Specifically, the optical image of the mark 6a will be blurred in the region of the mask 9 and has a greater dimension than the mask 9a, whereby part of the light from the source 5 passes through the transparent portion of the mask 9 other than the mask 9a to impinge upon the light receiving surface of the transducer element 10. Thus, it follows that the binocular steremicroscope is in out-of-focus condition whenever the transducer element 10 receives part of the light from the source 5 while the in-focus condition of the binocular stereomicroscope is indicated by a minimum output from the transducer element 10 which is produced when the optical image of the mark 6a completely coincides with the mask 9a to prevent any incidence of light from the source 5 upon the transducer element 10. In other words, the in-focus condition of the binocular stereomicroscope can be detected by monitoring a minimum output from the transducer element 10. If an automatic focussing system is arranged so that a minimum output from the transducer element 10 is maintained, the stereomicroscope is always maintained in focus, eliminating any need for a focussing operation and thus leaving both hands freely available to other operations such as a surgical operation.

Instead of the light shield 11 shown in FIG. 2, the mark member 6 may comprise a metal disc shield 13 which is centrally formed with a cylindrical opening 13a as shown in FIG. 4, or a similar light shield 15 which is centrally formed with a cruciform opening 15a as shown in FIG. 6. In these instances, the openings 13a, 15a define the mark 6a. In a corresponding manner, the mask member 9 may comprise a transparent glass disc 14 which is centrally formed with a circular shielding area 14a as shown in FIG. 5 for cooperation with the light shield 13 or a transparent disc 16 which is centrally formed with a cruciform shielding area 16a as shown in FIG. 7 for cooperation with the light shield 15. In these instances, the light shielding area 14a or 16a define the mask 9a, which has a photographic positive-negative relationship with the mark 6a. Accordingly, when the optical image of the mark 6a completely coincides with the mask 9a, the transducer element 10 produces a minimum output, thus enabling as in-focus condition to be detected.

It is not essential that the mark member 6 and the mask member 9 used in the in-focus detector of the invention establish a photographic positive-negative relationship therebetween, but a same member may be used for both. For example, the light shield 11 having the opening 11a as shown in FIG. 2 may be used as both the mark member 6 and the mask member 9. An in-focus condition is established when the optical image of the opening 11a formed in the first light shield 11, which is used as the mark member 6, coincides with the opening 11a formed in the second light shield 11 which is used as the mask member 9. At this time, an amount of light corresponding to the entire optical image impinges upon the light receiving surface of the transducer element 10. In out-of-focus condition, the optical image of the opening 11a in the first light shield 11 will be blurred on the second light shield 11, whereby the optical image is partly intercepted by portions of the second light shield other than the opening, thus reducing the light input to the transducer element 10. In other words, when a same member is used for both the mark and the mask member 6, 9, an in-focus condition is established in response to a maximum output from the transducer element 10. If an automatic focussing system is arranged to maintain a maximum output from the transducer element 10, the binocular stereomicroscope can be maintained in focus, dispensing with the need for a focussing operation.

FIG. 8 shows another embodiment of the invention. In the in-focus detector shown the first and the second beam splitter 7, 8, which are formed by semi-transmitting prisms, are replaced by first and second beam splitters 17, 18 which are formed by half mirrors. Specifically, the first beam splitter 17 is disposed intermediate between the erection prism 2A and the objective lens 3A of the observation optical system A, with the reflecting surface of the half mirror being directed toward the light source 5 and the lens 3A. The second beam splitter 18 is disposed intermediate the erection prism 2B and the objective lens 3B of the observation optical system B, with the reflecting surface of the half mirror being directed toward the transducer element 10 and the lens 3B. It is to be noted that a filter 19 is disposed between the first beam splitter 17 and the mark member 6 to filter out light from the source 5 by intercepting visible light and permitting invisible light such as infrared ray to pass therethrough. In a corresponding manner, a photoelectric transducer element of a high sensitivity to invisible light, such as infrared ray, is used as the element 10. In other respects, the arrangement is similar to the in-focus detector shown in FIG. 1.

In operation, when the mark member 6 is irradiated by light from the source 5, only the invisible component such as infrared ray of the light emitted by the source 5 is allowed to pass through the filter 19 to define the optical image of the mark 6a, which image is reflected by the first beam splitter 17 to be introduced into the optical path of the observation optical system A so as to be projected onto an object 4 being observed through the objective lens 3A. After reflection by the object 4, the optical image of the mark 6a passes through the objective lens 3B of the observation optics B to be reflected by the second beam splitter 18 in a direction out of the observation optical system B so as to be projected onto the transducer element 10 through the mask member 9.

Since the optical image of the mark 6a which is projected onto the object 4 is defined by invisible light, it does not interfere with the observation of the object 4 by the viewer. When the optical image is focussed onto the mask member 9, an in-focus condition can be detected by the transducer element 10. If the mark member 6 comprises a light shield 11 (13, 15) having an opening 11a (13a, 15a), or a transparent disc 12 (14, 16) having light shielding area 12a (14a, 16a), the mask member 9 may comprise a transparent disc 12 (14, 16) or light shield 11 (13, 15) so as to establish a photographic positive-negative relationship with respect to the mark member 6, thereby allowing the detection of an in-focus condition in response to a minimum output from the transducer element 10. If a same member is used for both the mask and the mark member 9, 6, an in-focus condition is detected in response to a maximum output from the transducer element 10.

The light source 5 used may be arranged to produce only invisible light such as infrared ray, thus allowing the placement of the filter 19 to be dispensed with. Alternatively, the light transmitting area of the mark member 6 may comprise a filter which allows the passage of invisible light alone therethrough. Specifically, if the light shield 11 (13, 15) is used as the mark member 6, the opening 11a (13a, 15a) thereof may be filled with a filter material. Where the transparent disc 12 (14, 16) is used, portion thereof other than the light shielding area 12a (14a, 16a) may be formed by a filter material.

As a further alternative, the half mirror which is used to act as the first and the second beam splitter 17, 18 may be formed by a dichromic mirror which selectively reflects a particular wavelength. This effectively prevents a reduction in the brightness level of the observation optical systems A, B which would be caused if normal semi-transmitting prisms or half mirrors are inserted therein, since only the invisible light component is reflected by the beam splitters 17, 18 which are formed by the dichromic mirrors while avoiding any reduction in the amount of visible light passing through the both optical systems A, B.

FIG. 9 shows a further embodiment of the invention. In the in-focus detector shown, a first and a second analyzer 21, 22 are disposed intermediate the erection prism 2A, 2B and a first and a second beam splitter 7, 8, respectively, of the observation optical systems A, B, respectively, while a polarizer 23 is disposed between the first beam splitter 7 and the mark member 6. The polarizer 23 used transmits S-polarization, for example, and correspondingly the first and the second analyzer 21, 22 is chosen to transmit P-polarization while intercepting S-polarization. Where the polarizer 23 is chosen to transmit P-polarization, the first and the second analyzer 21, 22 are chosen to transmit S-polarization while intercepting P-polarization.

If the light source 5 is of a usual design which produces visible light, the occurrence of flares in the observation optical systems A, B is likely. However, in the in-focus detector described above, the combined use of the analyzers 21, 22 and the polarizer 23 prevent the occurrence of flares in the observation optics A, B. For example, when the polarizer 23 transmits S-polarization, the light which is reflected by the surface of the objective lenses 3A, 3B to give rise to the flares also represent S-polarization, but such S-polarization is intercepted by the analyzers 21, 22, preventing them from reaching the eyes or film. The same applies when the polarizer 23 transmits P-polarization. Also the position of the optical image of the mark onto the object 4 does not interfere with the observation.

Instead of utilizing the analyzers 21, 22 and the polarizer 23, semi-transmitting films 7a, 8a on the joining surfaces of the first and the second beam splitter 7, 8 may be formed by thin films of a high refractive index, thus allowing them to act as polarizers. In this instance, oscillating components of the light from the source 5 which are perpendicular to the plane of FIG. 9 at the location of the beam splitters 7, 8 are reflected while horizontal components which are parallel to said plane transmit, thus preventing the occurrence of flares in the observation optical systems A, B while simultaneously avoiding any interference of the detecting light with the observation.

In the in-focus detector of the invention, the combination of the mask member 9 and the photoelectric transducer element 10 which receives light transmitting through the mask member 9 can be replaced by a single photoelectric transducer element 24 having a plurality of aligned light receiving areas 24a of an equal width $a$ which is equal to the width of the mark 6a formed in the mark member 6, as shown in FIG. 10. When the binocular stereomicroscope is in focus, the optical image of the mark 6a, shown in phantom line, will impinge on only the central one of areas, $24a_0$, which is located on the optical axis while other areas 24a receive no light input. In this manner, only the area $24a_0$ is allowed to produce an electrical signal. On the other hand, when the steromicroscope is in out-of-focus condition, the optical image of the mark 6a, as viewed over the transducer element 24, will be enlarged and blurred, as indicated in broken lines in FIG. 11, and the image location will be displaced from the central area $24a_0$. The displacement of the optical image of the mark 6a from the location of the central area $24a_0$ allows those areas 24a, which are located on the side of the central area $24a_0$ in which the displacement occurred, to produce an electrical signal, thus providing an indication as to the presence of such displacement as well as the direction of displacement indicating whether the arrangement is in a front or rear focus. Additionally, the magnitude of the displacement can be determined. Accordingly, an automatic focussing system can be arranged so as to respond to a distribution of outputs from the individual light receiving areas 24a of the transducer element 24.

In the foregoing embodiments, a separate objective lens is provided for each optical system A, B. If desired, a common objective lens could be used for both systems.

What is claimed is:

1. An in-focus detector for a binocular stereomicroscope, comprising:
   a first observation optical system including an objective lens and an eyepiece;
   a second observation optical system including an objective lens and an eyepiece;
   a first beam splitter disposed intermediate said objective lens and said eyepiece of said first observation optical system for projecting the optical image of a mark, which is used for detecting an in-focus condition, onto an object being observed through said optical systems;
   a second beam splitter disposed intermediate said objective lens and said eyepiece of said second observation optical systems for passing the optical image of the mark reflected off the object and passing through said objective lens of said second observation optical system to a position outside of said second observation optical system;

projecting means, including a mark member, for projecting said optical image of said mark through said first beam splitter and said first objective lens onto said object, said mark member being so located that it is conjugate to said object with respect to said first objective lens when said stereomicroscope is in focus;

a photoelectric transducer element located at said position outside said second observation optical system for receiving said optical image of said mark; and a mask located between said transducer element and said second beam splitter, the relative location of said mask and said object with respect to said stereomicroscope being such that said mask is conjugate with said object whenever said stereomicroscope is in focus, the relationship of said mask and said mark being such that the amount of light received by said transducer element is at one of a minimum or maximum level when said stereomicroscope is in focus.

2. An in-focus detector according to claim 1 in which the first and the second beam splitter are both formed by semi-transmitting prisms or half mirrors.

3. An in-focus detector according to claim 1, in which said mark member is a metal plate having an opening such as an elongate slit, circular slot or cruciform opening formed therein.

4. An in-focus detector according to claim 1, in which said mark includes a light shielding area in the form of an elongate slit, circle or cruciform which is formed on a glass plate, thus preventing the transmission of light therethrough.

5. An in-focus detector according to claim 1 in which said mask has a configuration corresponding to the configuration of said mark.

6. An in-focus detector according to claim 1, in which said mask is formed by a light shielding area a configuration corresponding to the configuration of said mark whereby said mark and said mask establish a relationship therebetween which corresponds to that between a photographic positive and negative.

7. An in-focus detector according to claim 5 in which the light receiving surface of said transducer element has an area greater than that of the projection of said mask thereon.

8. An in-focus detector according to claim 1, in which said projecting means including a source of light and wherein said first and said second beam splitter are each formed by dichromic mirrors which reflect only light of a particular wavelength, thus allowing only invisible light from said source of light to the incident on the transducer element.

9. An in-focus detector according to claim 1, in which said projecting means includes a source of visible light and wherein first and second analyzers are disposed intermediate said eyepieces of said first and second optical systems and said first and second beam splitters, respectively, and a polarizer is disposed intermediate said light source and said first beam splitter, said polarizer being chosen to permit the transmission therethrough of one of P-polarization or S-polarization light and said first and said second analyzers being chosen to permit the transmission of the other of P-polarization or S-polarization light thus preventing visible light from said light source from producing flares in said observation optical system.

10. An in-focus detector according to claim 5, in which said projecting means includes a light source and said mark member includes a light shielding area preventing the transmission of light therethrough, said light shielding area defining the shape of said mark and wherein said mask is formed of a light transmitting opening having a configuration corresponding to the configuration of said mark, whereby said mark and said mask establish a relationship therebetween which corresponds to that between a photographic positive and negative.

11. An in-focus detector according to claim 1, wherein said projecting means projects said mark in the form of invisible light.

12. An in-focus detector according to claim 11, wherein said projecting means includes a source of said invisible light.

13. An in-focus detector according to claim 11, wherein said projecting means includes a source of visible light and a filter which only permits the transmission of invisible light.

14. An in-focus detector according to claim 1, further including polarizing means for preventing the occurrence of flares in said observation optical systems.

15. An in-focus detector according to claim 1, wherein said second objective lens of said first and second optical systems are defined by a common objective lens.

16. An in-focus detector for a binocular stereomicroscope, comprising:

a first observation optical system including an objective lens and an eyepiece;

a second observation optical system including an objective lens and an eyepiece;

a first beam splitter disposed intermediate said objective lens and said eyepiece of said first observation optical system for projecting the optical image of a mark, which is used for detecting an in-focus condition, onto an object being observed through said optical systems;

a second beam splitter disposed intermediate said objective lens and said eyepiece of said second observation optical system for passing the optical image of said mark reflected off said object and passing through said objective lens of said second observation optical system to a position outside of said second observation optical system; and projecting means for projecting a mark through said first beam splitter and said first objective lens onto said object, said mark member being so located that it is conjugate with said first and second eyepieces when said stereo microscope is in-focus; and a photoelectric transducer element located at said position outside said second observation optical system for receiving said optical image of said mark, said photoelectric transducer element being conjugate with said object whenever said stereomicroscope is in-focus, said photoelectric transducer element comprising a plurality of light receiving areas which are aligned at a given interval such that an in-focus condition can be determined in accordance with the size and location of the optical image of said mark which falls on said light receiving areas.

* * * * *